(No Model.)
G. L. GERHARD.
FRICTION CLUTCH.
No. 403,098. Patented May 14, 1889.
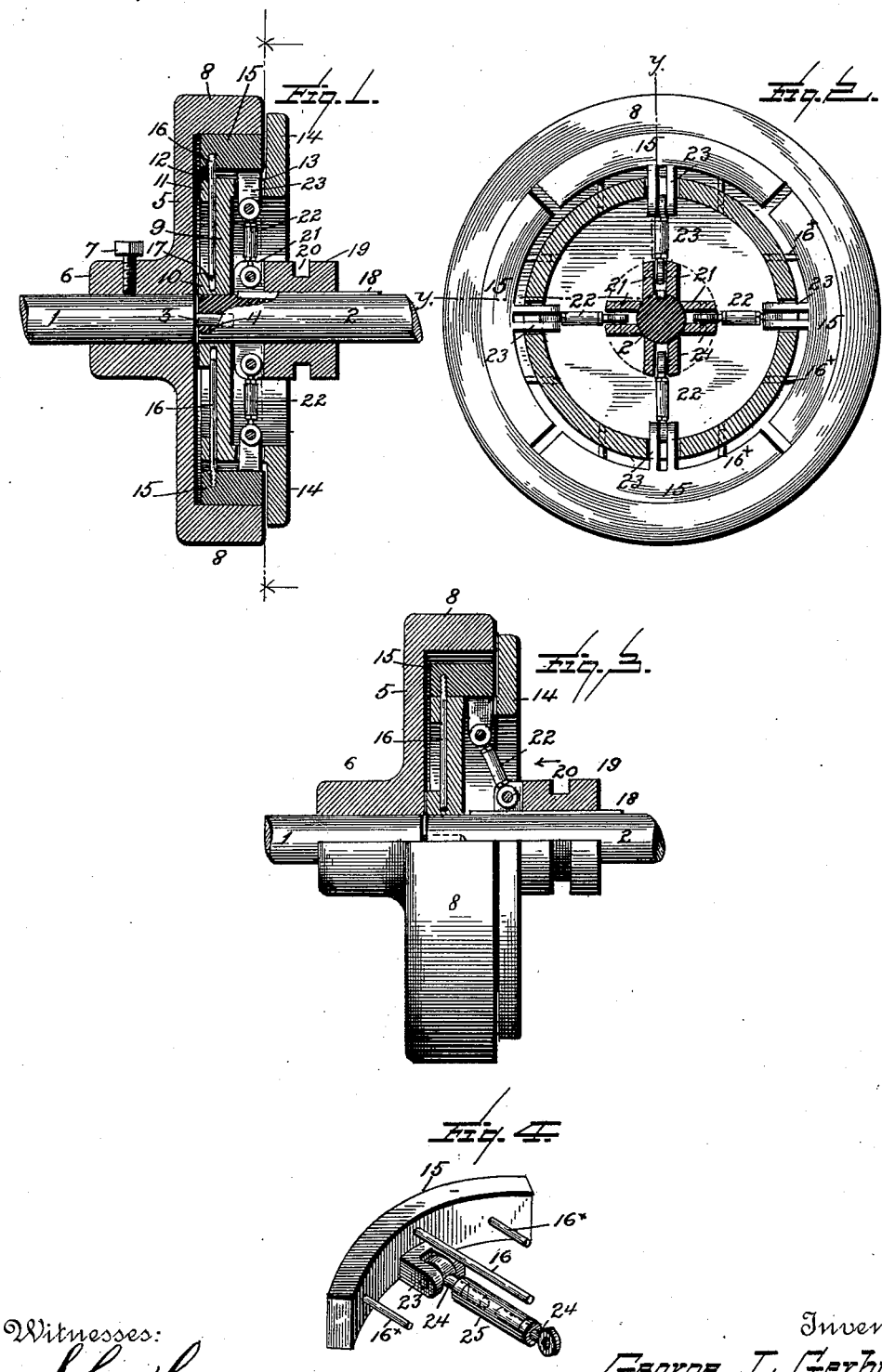
Witnesses:
J. C. Hills,
W. S. Duvall.
Inventor:
George L. Gerhard.
E. B. Stocking
Attorney.

UNITED STATES PATENT OFFICE.

GEORGE L. GERHARD, OF READING, PENNSYLVANIA.

FRICTION-CLUTCH.

SPECIFICATION forming part of Letters Patent No. 403,098, dated May 14, 1889.

Application filed November 10, 1888. Serial No. 290,430. (No model.)

*To all whom it may concern:*

Be it known that I, GEORGE L. GERHARD, a citizen of the United States, residing at Reading, in the county of Berks, State of Pennsylvania, have invented certain new and useful Improvements in Friction-Clutches, of which the following is a specification, reference being had therein to the accompanying drawings.

This invention has relation to that class of clutches in which a flanged band-wheel is connected to a shaft and adapted to coact with a movable contracting and expanding clutchwheel; and among the objects in view are to reduce the clutch in the number of parts necessary to its operation, simplify the construction, and render the parts capable of being easily cast and assembled, thus reducing the cost, and so constructing the device as a whole as to be strong, durable and serviceable in operation, and easily manipulated.

Other objects and advantages of the invention will hereinafter appear, and t' novel features thereof will be particularly pointed out in the claims.

Referring to the drawings, Figure 1 is a vertical longitudinal section of a clutch constructed in accordance with my invention, the parts being shown in operative position. Fig. 2 is a section on the line $x\ x$ of Fig. 1. Fig. 3 is a partial section on line $y\ y$ of Fig. 2 and side elevation of the clutch, the parts being shown in inoperative position; and Fig. 4 is a detail in perspective of one of the segments.

Like numerals of reference indicate like parts in all the figures of the drawings.

1 and 2 represent separate shafts, the ends of which abut, one of said shafts being provided with a tenon, 3, designed to enter a corresponding bore, 4, formed in the opposite end of the companion shaft, whereby the two shafts are maintained in alignment. Upon the shaft 1 is a band wheel or pulley, 5, which is formed with a central hub portion, 6, through which is passed a set-screw, 7, that bears upon the shaft and maintains said pulley rigidly thereon. The pulley 5 is also formed with a peripheral annular flange, 8. Upon the opposite shaft, 2, is mounted the clutch pulley or disk 9, the same being rigidly secured to its shaft at its hub 10. The pulley or disk 9 is formed with a peripheral double flange, 11, perforated at one side, as at 12, and at its opposite side, as at 13, the outer perimeter of the flange being formed with a second right-angular flange, 14. The pulley 9 is considerably smaller in diameter than the pulley 8, and in the space between the flanges of the two pulleys there are mounted a series of segments, 15, which are supported in position upon the outer surface of the flange 11 of the pulley 9 by long and short guiding-pins 16 16, depending from the segments and protruding through the openings 12 and 13, respectively, formed in the flange 11, the long pins 16 terminating in sockets 17, formed in the hub 10 of the pulley.

Upon the shaft 2 there is formed or provided a gib, 18, and mounted to slide thereon is a collar, 19, having a central annular groove, 20, into which the usual operating-lever is designed to take. The forward end of the collar 19 is provided in pairs with a series of oppositely-located perforated lugs, 21, (in this instance four in number,) which form bearings for one end of a series of toggle-links, 22, the opposite ends of said levers being loosely connected in opposite perforated depending lugs, 23, projecting from the inner surfaces of the segments 15 and through the openings 13, formed in the annular flange 11. As shown by dotted lines, Fig. 4, these links may be made adjustable by forming the spindle portions 24 separately and with opposite screw-threads and connecting the same by a right-and-left-handed screw-threaded sleeve, 25. By this construction it is apparent that, taking the position as shown in Fig. 3, by moving the collar in the direction indicated by the arrow, the toggle-links 22 are made to assume more nearly a vertical position, and as they assume this position the segments 15 are forced upwardly and make contact with the inner surface of the flange 8 of the fixed pulley 5, the pins 16 serving to guide the segments in a direct line and firmly against the flange.

By means of the adjustability of the toggle-levers 22 the contact between the segments and the flange may be made more or less positive, as occasion may require.

It is evident from the above description that the several principal parts may be easily and conveniently cast, and that they may be assembled with very little hand-work.

When the clutch is in operative position, the toggle-levers 22 are in reality brought past a vertical position at their lower point, whereby a locking contact is accomplished and friction between the collar 19 and its operating-lever (not shown) is avoided.

Having described my invention, what I claim is—

1. In a clutch of the class described, the combination, with independent shafts 1 and 2, of the pulley 5, having the hub 6, fixed to the shaft 1 and formed with the flange 8, the clutch-pulley 9, mounted upon the shaft 2, and having the flanges 11 and 14, perforated, as at 12 and 13, and having the segments 15, provided with pins passing through the openings 12, and with perforated lugs 23, and of the sliding sleeve 19, mounted upon the gib 18 of the shaft 2, and the bearing-lugs 21, and toggle-links 22, connecting the lugs 21 and 23, substantially as specified.

2. The shaft 1, having the pulley 5, formed with the hub 6, and set-nut 7, and the peripheral flange 8, in combination with the shaft 2, having the gib 18, and the fixed clutch-pulley 9, having the flanges 11 and 14, perforated, as at 12 and 13, the segments 15, having pins 16, passing through openings 12, and having lugs 23, passing through openings 13, and provided with one member of a toggle-link, 22, and the sliding collar 19, having the annular groove 20, mounted on the shaft 2, and having opposite lugs, 21, and provided with the opposite member of the toggle-link, each of said members having oppositely-disposed screw-threads, and an oppositely-threaded adjusting-sleeve for connecting said members, substantially as and for the purpose specified.

In testimony whereof I affix my signature in presence of two witnesses.

GEORGE L. GERHARD.

Witnesses:
HARRY DEETER,
W. B. WEAVER.